United States Patent
Nuttall

Patent Number: 5,862,957
Date of Patent: Jan. 26, 1999

[54] SEED INOCULANT APPLICATOR

[76] Inventor: Eldon Nuttall, P.O. Box 63, Pense, Saskatchewan, Canada, S0G 3W0

[21] Appl. No.: 742,716
[22] Filed: Nov. 1, 1996
[51] Int. Cl.$^6$ .................................................. G01F 11/20
[52] U.S. Cl. ........................................... 222/241; 222/413
[58] Field of Search .................................... 222/239, 240, 222/241–242, 333, 334, 413

[56] References Cited

U.S. PATENT DOCUMENTS

| | | | |
|---|---|---|---|
| 2,641,384 | 6/1953 | Mateer | 222/241 |
| 2,643,026 | 6/1953 | Graig et al. | 222/413 |
| 2,686,618 | 8/1954 | Mateer | 222/413 |
| 5,265,773 | 11/1993 | Harada | 222/241 |

Primary Examiner—Philippe Derakshani
Attorney, Agent, or Firm—Clifford W. Browning; Woodard, Emhardt, Naughton Moriarty & McNett

[57] ABSTRACT

A seed inoculant applicator comprising an inoculant container into which dry or semi-dry material is placed; an applicator spout extending from the bottom center of the inoculant container; an agitator mixing assembly comprising a mounting framework and a shaft component, the assembly attached to the inoculant container and holding the shaft component in place to the center of the mounting framework and to the inoculant container, the shaft component extending down from the top center of the inoculant container through the inoculant container and through the applicator spout to the end of the applicator spout, to which is attached a mixing paddle which rotates within the inoculant container and an auger which rotates within the applicator spout and carries the agitated dry or semi-dry material down through the inoculant container and through the applicator spout. The agitator mixing assembly is mechanically driven. An applicator mounting bracket which allows for the stationary attachment of the seed inoculant applicator to another surface is disclosed. The seed inoculant applicator is used to provide controlled, constant and precise application of inoculants and other concentrated treatments to agricultural seed material as the seed material is otherwise handled.

14 Claims, 8 Drawing Sheets

FIG. 3A: SHORT AUGER

FIG. 3B: SLEEVE

SEED INOCULANT APPLICATOR

BACKGROUND OF THE INVENTION

Recently changing consumption trends, along with improved economies of scale, have led large numbers of agricultural field producers to abandon their traditional seeding and allocations, planting specialty crops such as lentils, peas, and other vegetables and grains in the place of traditional staples such as wheat and the like.

These new specialty crops require different, and in some cases intensified, farm treatment and management practices. This crop changeover has in many cases necessitated modifications to farming practices, including changes to procedures and equipment used from the seeding to the harvest of such specialty crops. One particular procedure which has arisen with respect to the growth of such legume crops as lentils and peas has been the added step of treatment of the seed with a rhizobium inoculant, in order to increase crop protection and yield. The inoculant consists of any number of treatment elements for the seed, the most important of which being large amounts of one or more strains of rhizobia bacteria. Along with the rhizobia, and any other treatment elements which producers or agricultural developers might wish to apply to the seed, the other major component of an inoculant is a carrier.

These inoculants are available in a number of formats, including liquid, dry and adhesive ("sticky" format). A liquid inoculant obviously has an inert liquid carrier which allows for the adhesion of the active elements of the inoculant to the seed. Liquid inoculants are problematic in that they consist of substantial volume, where any significant amount of dilution is done to make the even application any less problematic. This has a number of other effects as well. The larger the amount of carrier which is used, the heavier and larger the inoculant packaging becomes, increasing transport costs for the manufacturer and eventually the consumer price to the farmer for the product. Also, the packaging itself which is used is problematic in that rigid packaging, such as plastic jugs, needs to be used for the liquid and the farmer is then left with a significant disposal problem after treating the seed. Liquid inoculant can also have detrimental and fouling effects upon the seeding implements and other farm machinery used, which are designed for the treatment and handling of dry product. If water is used as a carrier, rusting of farm equipment may take place over time. If other rust-inhibiting liquid carriers are used, there may be detrimental effects on the land, and production costs for the inoculant product may again be increased.

Dry inoculant would have an inert powdered carrier. The problem with dry inoculants is that they do not adhere at all to the seed as the inoculant is applied, and by the time the seed is handled through the augers and then through the seeding equipment itself there is no way to ensure that any sort of even coverage is obtained. With any large amount of movement of the farm seeding equipment, the dry inoculant can quite easily work its way down to the bottom of the hopper in which the seed stock is stored for seeding, and as such no even distribution is attained and the inoculant may end up in large isolated deposits in the seeded crop.

A newer product which is becoming favoured by producers, are the quasi-dry adhesive inoculants. These consist of an adhesive carrier, such as peat moss or the like, to which the active ingredients are mixed and which 'sticks' to the seed as the seed is treated and maintains its adhesive quality for long enough to keep the beneficial ingredients of the inoculant adhered to the seed throughout handling in the seeding equipment, to the placement of the seed in the soil. The main problem with the application of the adhesive inoculant is that it is difficult to obtain even coverage without over-treatment, because by the very nature of the product it does not flow easily and evenly from its shipping container into the treatment auger. Lumps can form, causing over-treatment in some areas, while flow from the package may plug up on occasion creating pockets of non-treated seed as well.

The benefit to both the dry and adhesive inoculants is that they can be packaged and shipped in smaller containers, such containers usually being able to be cubical in shape (such as stackable bags), requiring less overall packaging and wasting less transport space. Costs to the producer for the transport aspect of the production of the inoculant can be lowered in this way.

It is necessary to apply the inoculant as soon before seeding as possible, because prolonged exposure deactivates large numbers of the beneficial rhizobia bacteria in the inoculant. Inoculation of the seed is done by application of the inoculant to the seed as it is augered into the farm seeding equipment—drills, air seeder, etc. As such one of the problems involved in applying the inoculant to the seed is one of safety—the auger operator is currently required to feed the inoculant into the drill auger along with the seed and in order to lessen the contact and exposure to air of the inoculant it is necessary to operate in close proximity to the moving auger. The inherent safety concerns here are obvious.

A second consideration for the farmer in treating the seed as it is loaded into the seeding equipment is one of cost versus efficiency. These inoculants are costly, and the seed requires even and sufficient treatment for the inoculant to be effective. However in order to maintain the cost efficiency of the treatment, the inoculant cannot be over-applied. One answer to this problem has been to attempt to dilute the active ingredients sufficiently with the carrier so that less scientific precision is required in order to provide an even and cost-efficient distribution of the inoculant throughout a batch of seed. This still, however, requires some amount of accuracy.

This invention has in contemplation the provision of a precise and constant method for the application of rhizobia inoculants or the like to agricultural crop seed as the seed is otherwise handled—i.e. augered, in order to ensure even and sufficient coverage of the seed with the inoculant, while keeping over-treatment and waste to a minimum and maintaining farm safety.

SUMMARY OF THE INVENTION

It is the object of the present invention to provide a precise and constant method and apparatus for the application of rhizobia inoculants of the like to agricultural crop seed as the seed is otherwise handled.

It is the further object of the invention to ensure even and sufficient coverage of the seed with the inoculant, while keeping over-treatment and waste to a minimum and maintaining farm safety.

The invention, a seed inoculant applicator, accomplishes its objectives comprising substantially an inoculant container into which dry or semi-dry inoculant container into which dry of semi-dry material is placed; an applicator spout extending from the bottom centre of the inoculant container; an agitator mixing assembly comprising a mounting framework and a shaft component, said mounting framework attached to the inoculant container and holding the shaft component in place to the centre of the mounting framework and to the inoculant container, the shaft component consisting of a rotary shaft extending down from the top centre of the inoculant container though the inoculant container and through the applicator spout to the end of the applicator spout, to which is attached a mixing paddle which rotates within the inoculant container and an auger which rotates within the applicator spout and carries the agitated dry or semi-dry material down through the inoculant container and through the applicator spout to dispense the dry of semi-dry material through the end of the applicator spout as the rotary shaft is rotated; an agitator drive assembly consisting of a drive mounting bracket, a rotary motor and drive components, said agitator drive assembly mounted to the top of the inoculant container and engaging the rotary shaft of the agitator mixing assembly and which drives the rotary shaft of the agitator mixing assembly, and an applicator mounting bracket which allows for the stationary attachment of the seed inoculant applicator to another surface; said seed inoculant applicator operated by placing dry or semi-dry particulate material into the inoculant container, the motor is turned on and the dry of semi-dry material is agitated within the inoculant container by the mixing paddle and is dispensed evenly and constantly from the applicator spout.

The inoculant container could be hopper-bottomed. It could be cylindrical, or another shape. The inoculant container could be permanently attached to the remainder of the unit, or could be detachable from the agitator drive assembly.

The motor could have variable speed setting, but should provide constant torque. An electric of hydraulic motor might be used. A belt and pulley drive system could be used to drive the agitator mixing assembly. The belt and pulley system might include a number of pulleys of different diameters which allows the switching of the drive ratio to the agitator mixing assembly and the speed of the rotary shaft without altering the constant torque on the rotary shaft. Alternatively, a chain drive system might be employed.

The applicator spout could be built to accommodate a removable sleeve to change the inside diameter of the applicator spout, and the auger rendered removable so that in such a case it could be exchanged for an auger of a different size. The auger does not need to reach all the way down inside the length of the applicator spout.

This device contemplated by the present invention provides an improvement over current, mainly manual, methods of applying inoculants and other agricultural seed treatment as the seed stock is otherwise handled. The inoculant is applied evenly and with more control and precision than manual application, and farm safety is improved because farmers do not need to manually feed the inoculant material directly into the auger of other equipment being used to otherwise handle the seed.

DESCRIPTION OF THE DRAWINGS:

The invention will now be described in more detail in accordance with the following figures. In the drawings like characters of reference indicate corresponding parts in the different figures.

DETAILED DESCRIPTION OF THE DRAWINGS

According to the invention there is provided a seed inoculant applicator comprising an inoculant container into which dry or semi-dry material is placed; an applicator spout extending from the bottom centre of the inoculant container; an agitator mixing assembly comprising a mounting framework and a shaft component, said mounting framework attached to the inoculant container and holding the shaft component in place to the centre of the mounting framework and to the inoculant container, the shaft component consisting of a rotary shaft extending down from the top centre of the inoculant container through the inoculant container and through the applicator spout to the end of the applicator spout, to which is attached a mixing paddle which rotates within the inoculant container and an auger which rotates within the applicator spout and carries the agitated dry or semi-dry material down through the inoculant container and through the applicator spout to dispense the dry or semi-dry material through the end of the applicator spout as the rotary shaft is rotated; an agitator drive assembly consisting of a drive mounting bracket, a rotary motor and drive components, said agitator drive assembly mounted to the top of the inoculant container and engaging the rotary shaft of the agitator mixing assembly and which drives the rotary shaft of the agitator mixing assembly; and an applicator mounting bracket which allows for the stationary attachment of the seed inoculant applicator to another surface.

Figure 1:
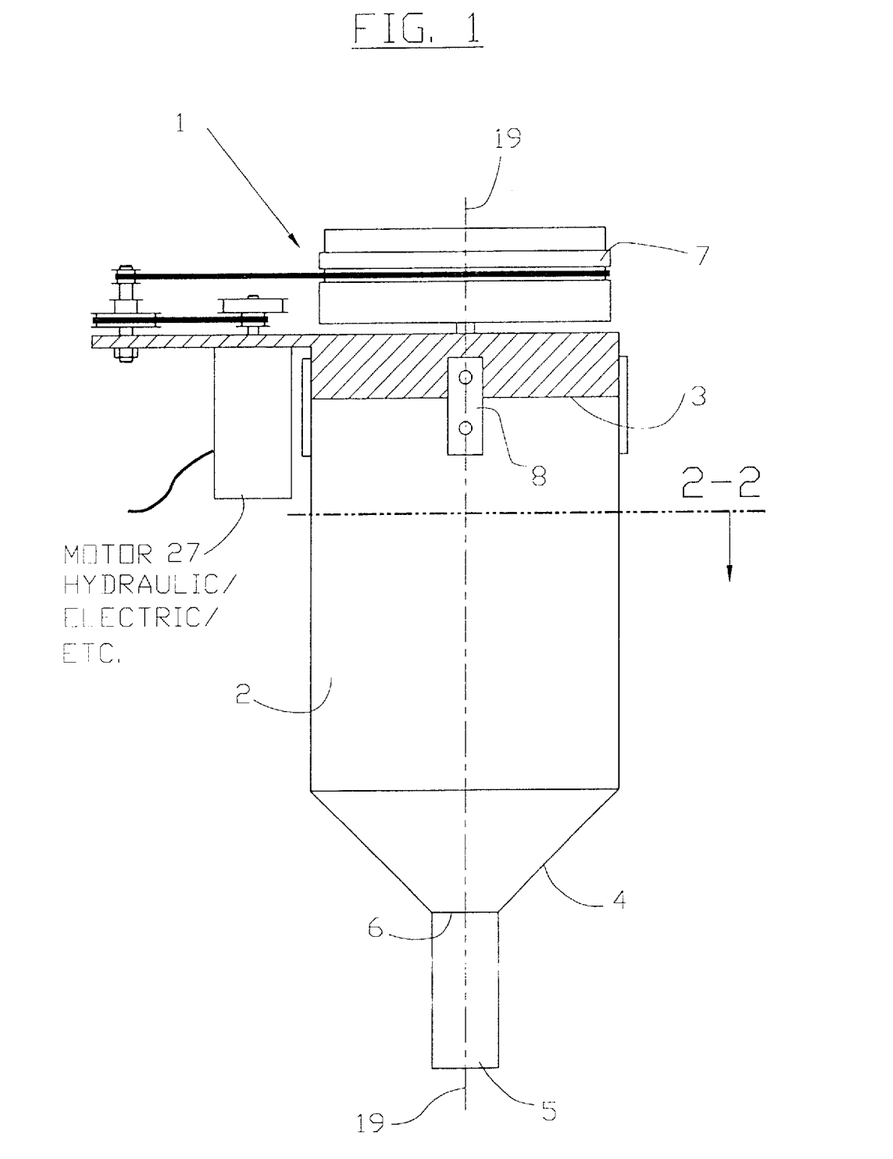
FIG. 1 is a side view of the seed inoculant applicator according to the preferred embodiment of the present invention.

Turning first to FIG. 1, which illustrates the currently preferred embodiment of the present invention, a seed inoculant applicator 1 is shown. The main body of the seed inoculant applicator is constructed of an inoculant container 2 which is open at one top end 3 and closed at the other bottom end 4. An applicator spout 5 is attached to and extends downward from the centre of the closed bottom end 4 of the inoculant container 2, attachment point shown at 6.

In the preferred embodiment shown here, the inoculant container 2 is cylindrical, and the closed bottom end 4 tapers towards its centre and narrows in the shape of a funnel, converging to an opening of the same diameter as the applicator spout at 6 to which the applicator spout 5 is attached. While the present embodiment contemplates a hopper-bottomed inoculant container, it will be understood that inoculant containers of different shapes on the closed bottom end are contemplated within the scope of this invention. In the present embodiment, the applicator spout 5 is also cylindrical. It will also be understood that applicator spouts of various shapes, diameters and lengths are contemplated within the scope of this invention.

Also in FIG. 1 is illustrated the agitator drive assembly 7 mounted onto the open top end 3 of the inoculant container. In the present embodiment the agitator drive assembly 7 is detachable from the inoculant container 2 using a number of clips 8 or other fastening device. While the agitator drive assembly 7 in the current embodiment is rendered detachable from the inoculant container for ease of cleaning the inoculant container, it will be understood that a permanently fixed agitator drive assembly is contemplated within the scope of this invention.

Figure 4:
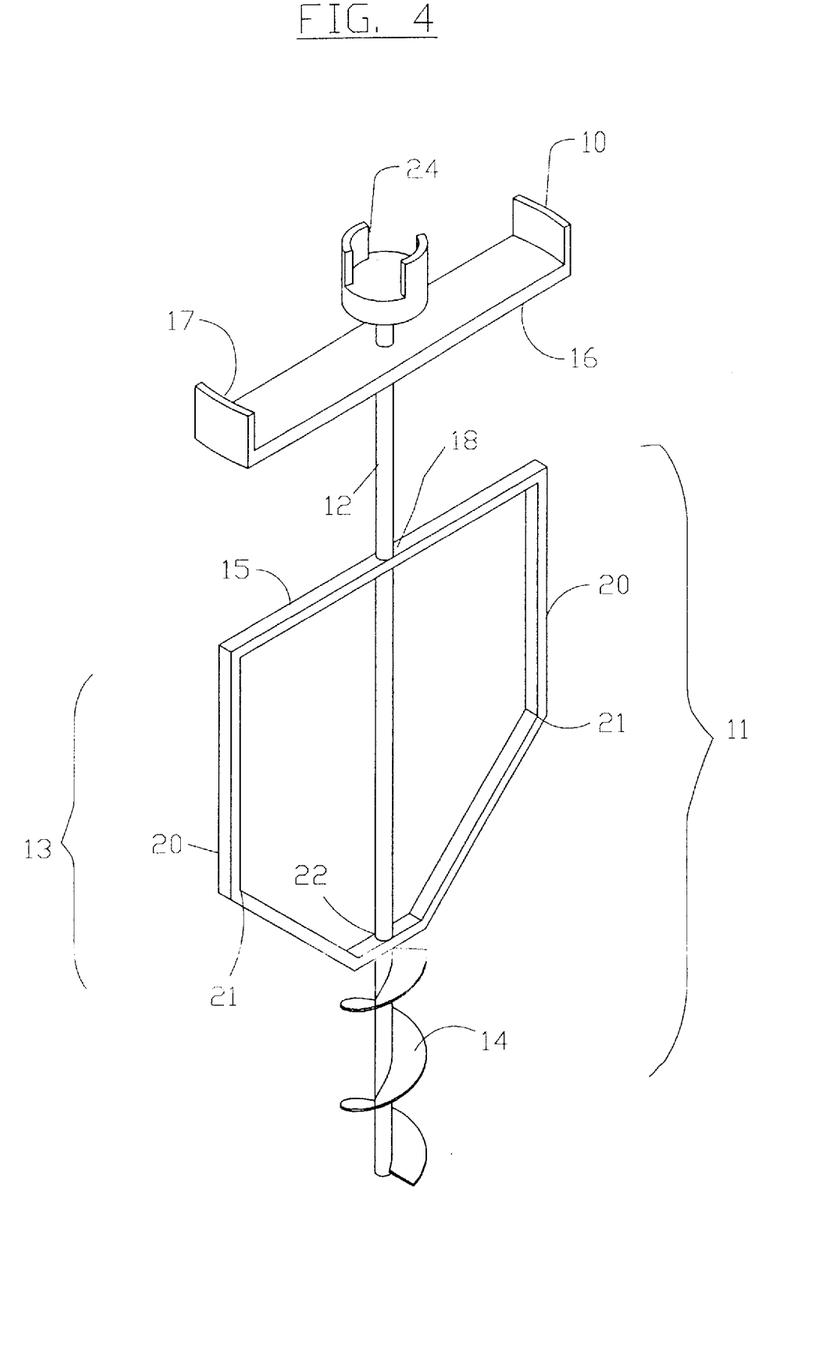
FIG. 4 is a perspective view of the agitator mixing assembly.

The agitator mixing assembly is shown in detail in FIG. 4. The agitator mixing assembly 9 consists of a mounting framework 10 and a shaft component 11. The mounting framework 10 in turn consists of a rigid narrow strap 16, of metal or the like, which is the dimension of the open top end 3 of the inoculant container and is bent at right angles on both ends providing short attachment tabs 17 which can be attached to the inner edge of the inoculant container 23 using rivets or other attachments.

Attached to the centre of the rigid narrow strap 16 such that it extends downwards through the centre line 19 of the inoculant container and will rotate freely along its axis perpendicular to the rigid narrow strap 16 is the shaft component 11 of the agitator mixing assembly, made up of a rotary shaft 12; a mixing paddle 13 which is firmly attached to the rotary shaft such that it rotates with the rotary shaft 12; and an auger 14 which is also attached to the rotary shaft 12 below the mixing paddle 13 and rotates with the rotary shaft 12.

The mixing paddle 13 in the current embodiment is constructed such that the inoculant or other material to be mixed passes through it as the paddle moves through that material. Specifically the mixing paddle 13 in this embodiment discloses a top arm 15 perpendicular to the rotary shaft 12, attached to the rotary shaft 12 at a point 18 above the hopper bottom of the inoculant container 2. From the ends of this top arm 15, two side arms 20 extend downward at approximately right angles. These two side arms 20 extend down from the top arm 15 to a point 21 just above where the inward slope of the closed bottom end 4 of the inoculant container begins. From this point 21 the two side arms 20 are bent at angles to roughly follow the slope of the closed bottom end of the inoculant container without touching the closed bottom end of the inoculant container, to a point 22 where the two arms 20 are fixed back to the rotary shaft 12. The width of the mixing paddle 13 is slightly less than the width of the inoculant container 2, allowing the paddle 13 and the shaft 12 to rotate freely along their axis without encountering the inner edge 23 of the inoculant container. The mixing paddle 13 is firmly attached to the rotary shaft 12 so that it will rotate within the inoculant container 2 when the rotary shaft 12 is rotated. It will be understood that mixing paddles of other shapes and configurations, similarly mounted to rotate along the axis of the rotary shaft 12, will be contemplated within the scope of this invention.

Attached to the rotary shaft 12 below the mixing paddle at such a point that it travels within the applicator spout 5 is an auger 14, which carries material down out of the inoculant container 2 through the applicator spout 5. The outer diameter of the auger is slightly less than the inner diameter of the applicator spout, allowing the auger 14, the mixing paddle 13 and the shaft 12 to rotate freely along their axis without binding on the inner surface of the applicator spout 5. The auger should still travel snugly within the applicator spout, to maintain control over the disbursement of the inoculant or other material. It is contemplated that the length of both the applicator spout and the auger could be varied, in order to provide different mounting configurations for the seed inoculant applicator. It is further contemplated that the seed inoculant applicator could be manufactured such that the auger did not reach down the entire length of the applicator spout, and in this way a longer applicator spout, perhaps with flexible joints in it, could be used to provide for further flexibility in mounting and use while still maintaining the constant material flow rate provided by the auger.

Figures 3, 3A, 3B:
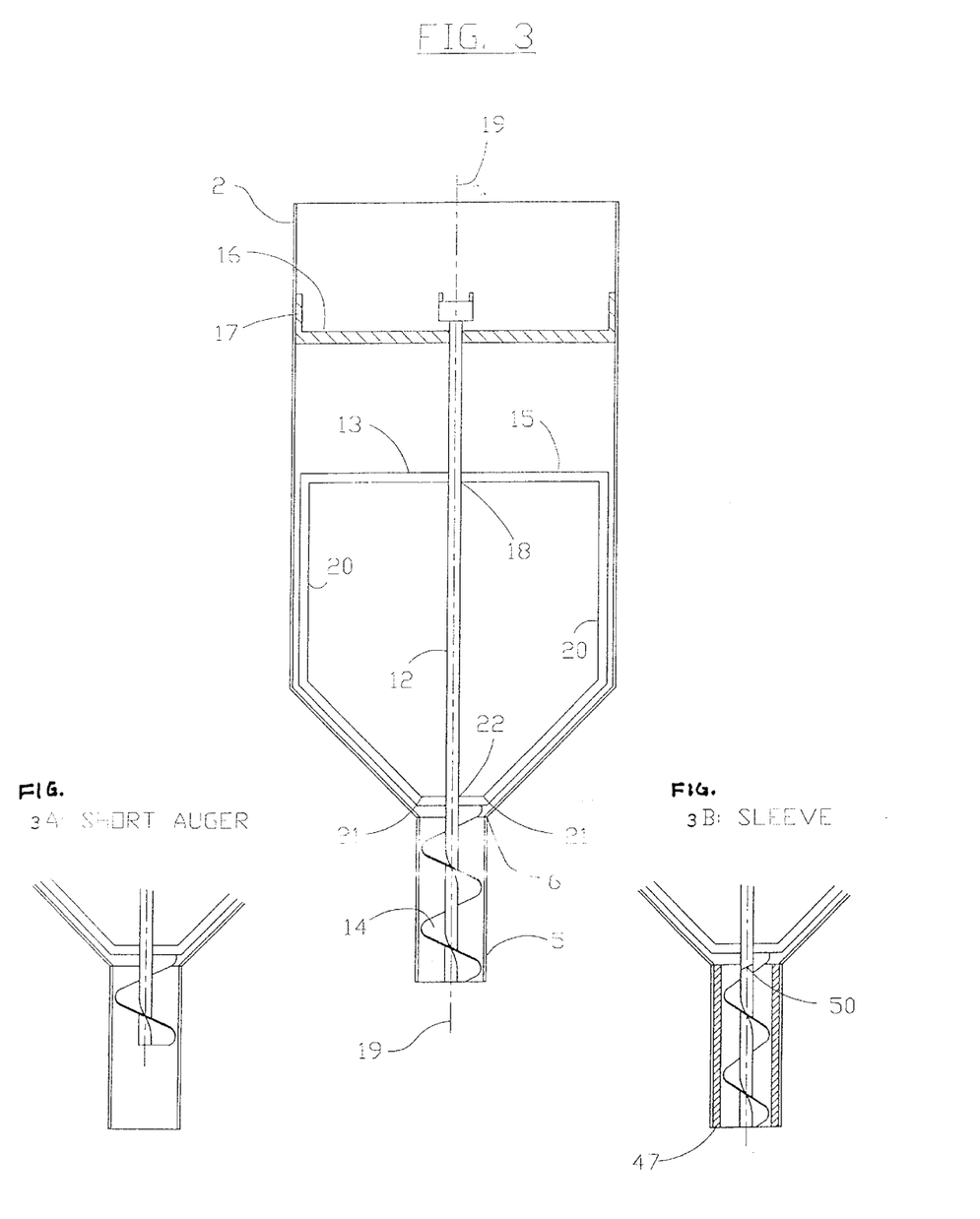
FIG. 3 is a cutaway side view of the inoculant container, showing the agitator mixing assembly in place.
FIG. 3A is a partial cutaway side view of a short auger in place in the container of FIG. 3.
FIG. 3B is a partial cutaway side view of a sleeve in place in the container of FIG. 3.

FIGS. 3 and 4 show the attachment of the agitator mixing assembly 9 within the open top end of the inoculant container 2. Thus when the agitator mixing assembly 9 is attached in place in the inoculant container 2, the mixing paddle 13 is suspended within the inoculant container 2 and the auger 14 is held in place within the applicator spout 5. When the rotary shaft 12 is turned the mixing paddle 13 turns within the inoculant container 2 to stir and loosen the inoculant or other material to be applied, and the auger 14 carries the material down through the applicator spout 5 to be dispensed. The auger 14 provides a constant and steady delivery of inoculant or other material, the volume of which can be adjusted by increasing or decreasing the speed of rotation of the rotary shaft 12. It is contemplated that the auger could be made removable and interchangeable from the rotary shaft. A different sized auger, coupled with a corresponding interchangeable sleeve placed inside the applicator spout, would allow for different application speeds or levels.

Figure 2:
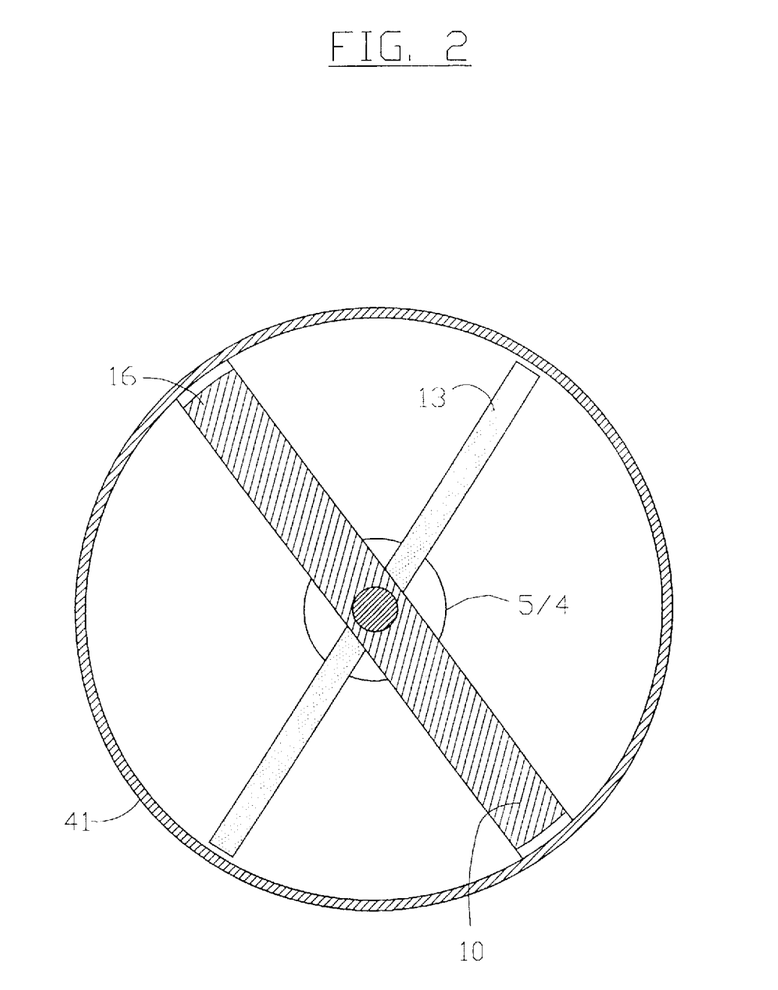
FIG. 2 is a top view of the inoculant container, along lines 2—2 of FIG. 1.

The rotary shaft 12 extends beyond the top edge of the rigid narrow strap 16, to engage the agitator drive assembly 7. In the preferred embodiment, and as best seen in FIGS. 2 and 3, there is provided an engagement mechanism 25 on the end of the rotary shaft 12 above the rigid narrow strap 16 to which there is a complementary engagement mechanism 26 on the bottom of the agitator drive assembly 7, such that when the detachable agitator drive assembly 7 is attached into place on top of the inoculant container 2, the engagement mechanisms 25 and 26 lock together and the agitator mixing assembly 9 is engaged and rotary power provided to the rotary shaft 12.

Figure 6:
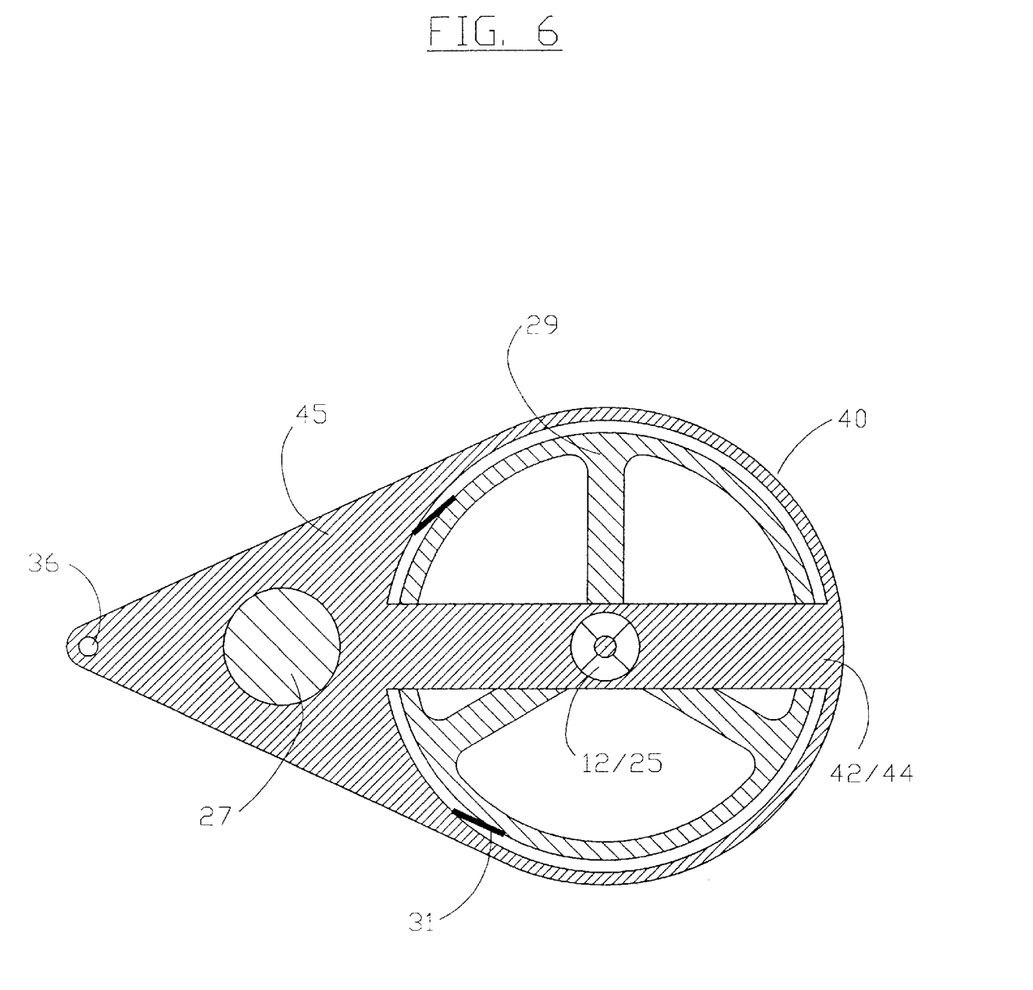
FIG. 6 is a bottom view of the agitator drive assembly.
Figure 7:
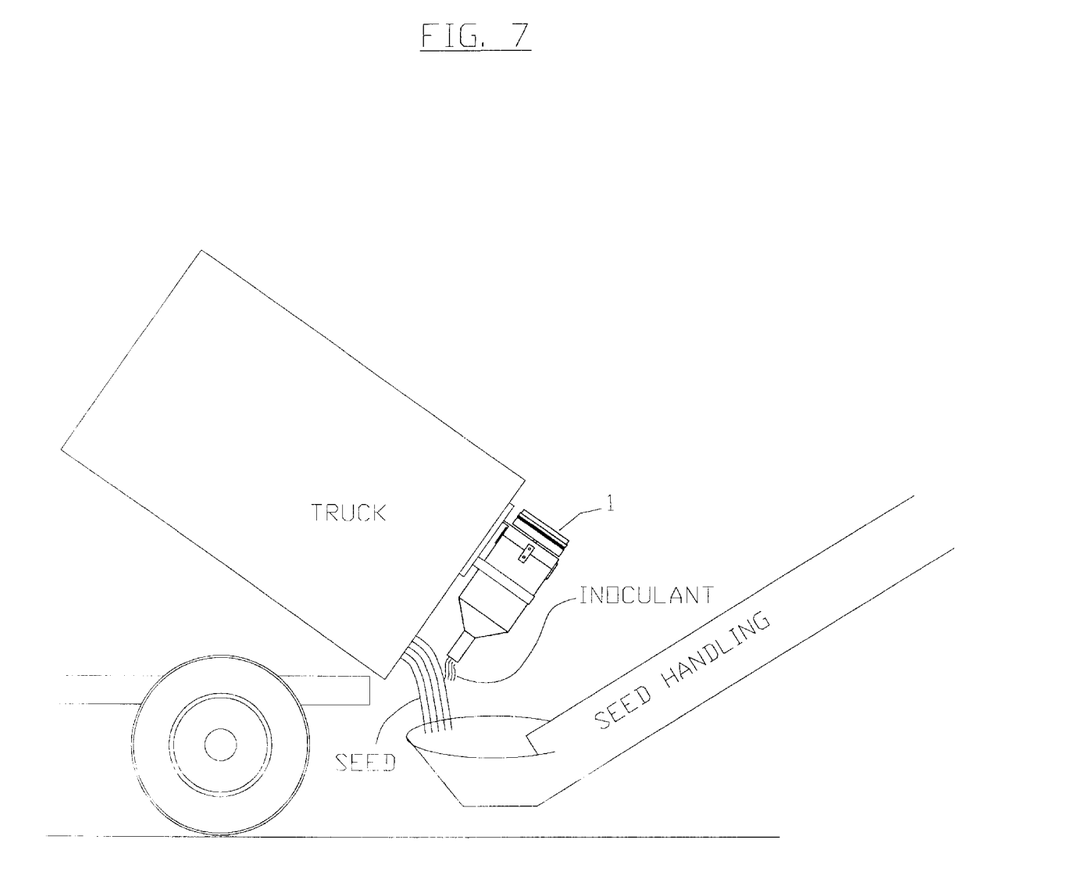
FIG. 7 demonstrates the mounting of the seed inoculant applicator on a farm transport truck.

The speed of the rotary shaft 12 is controlled by the agitator drive assembly 7, as shown in FIGS. 6, 7 and 8. The agitator drive assembly 7 is comprised of: a drive mounting bracket 26; a rotary motor 27 mounted such that the motor drive shaft 38 is on a perpendicular axis to the plane of the drive mounting bracket 26; and drive components 28. In the present embodiment of the invention, the drive components 28 include: a flywheel 29 which is spoked, with a flywheel belt path 30 for a belt to operate around the outer edge of the flywheel; a pulley spindle 32 extending upwards from the drive mounting bracket 26, and mounted by a way of a bearing or the like such that the pulley spindle 32 is held in a fixed position to the drive mounting bracket 26 but is free to rotate along its axis; a spindle drive pulley 33 attached to the top of the pulley spindle 32, the spindle drive pulley belt path 34 being horizontally in line with the flywheel belt path 30; a main drive belt 31 running from the spindle drive pulley 33 to the flywheel 29 in the flywheel belt path 30 and the spindle drive pulley belt path 34 such that when the pulley spindle 32 is rotated along its axis the flywheel 29 turns correspondingly; a number of transfer pulleys 35 of various diameters attached to the pulley spindle 32 in between the pulley spindle mount 36 and the spindle drive pulley 33, and a number of power pulleys 37 of varying diameters attached to the motor drive shaft 38 such that the belt paths of the various power pulleys 37 are in horizontal alignment with the belt paths of the various transfer pulleys 35; and a power transfer belt 39 running in the belt paths of, at any one time, one aligned pair of the power pulleys 37 and the transfer pulleys 35.

The varying diameters of the power pulleys 37 and the transfer pulleys 35 makes it possible to vary the speed of the agitator mixing assembly while maintaining constant power/ torque on the rotary shaft 12 of the agitator mixing assembly by simply shifting the position of the power transfer belt 39 to a differently sized aligned pair of the power pulleys 37 and the transfer pulleys 35, thus changing the drive ratio.

The drive mounting bracket 26 is shown in detail in FIG. 6. It consists of: a tubular portion 40 which fits around and is attached to the outer edge 41 of the inoculant container; a tubular cross brace 42 attached to and spanning across the centre of the tubular section 43, above the upper face 43 of which the flywheel 29 can be mounted for rotation and also below the lower face 44 of which can be attached the engagement device 28 for engaging the agitator mixing assembly 9, the flywheel and engagement mechanism joined through the tubular cross brace in the preferred embodiment by a partial rotary shaft mounted to the tubular cross brace with a bearing or the like such that the partial rotary shaft can rotate along its axis, the flywheel and engagement mechanism rotating with the partial rotary shaft; a power mounting flange 45 attached to one edge of the tubular portion 40 parallel to the mounted tubular cross brace 42 but not necessarily in planar alignment with the tubular cross brace 42, and to which the motor 27 and drive components 28 can be attached; and clips 8 for attaching the agitator drive assembly 7 to the inoculant container 2. Also attached to the drive mounting bracket 26 is the applicator mounting bracket 9 for attaching the seed inoculant applicator 1 to a farm implement or other object.

In the present embodiment of the rotary motor 27 is electric. It will be understood, however, that other methods of power such as a pneumatic or hydraulic motor could be used. A hydraulic motor is also shown at 27 in FIG. 1.

Figure 5:
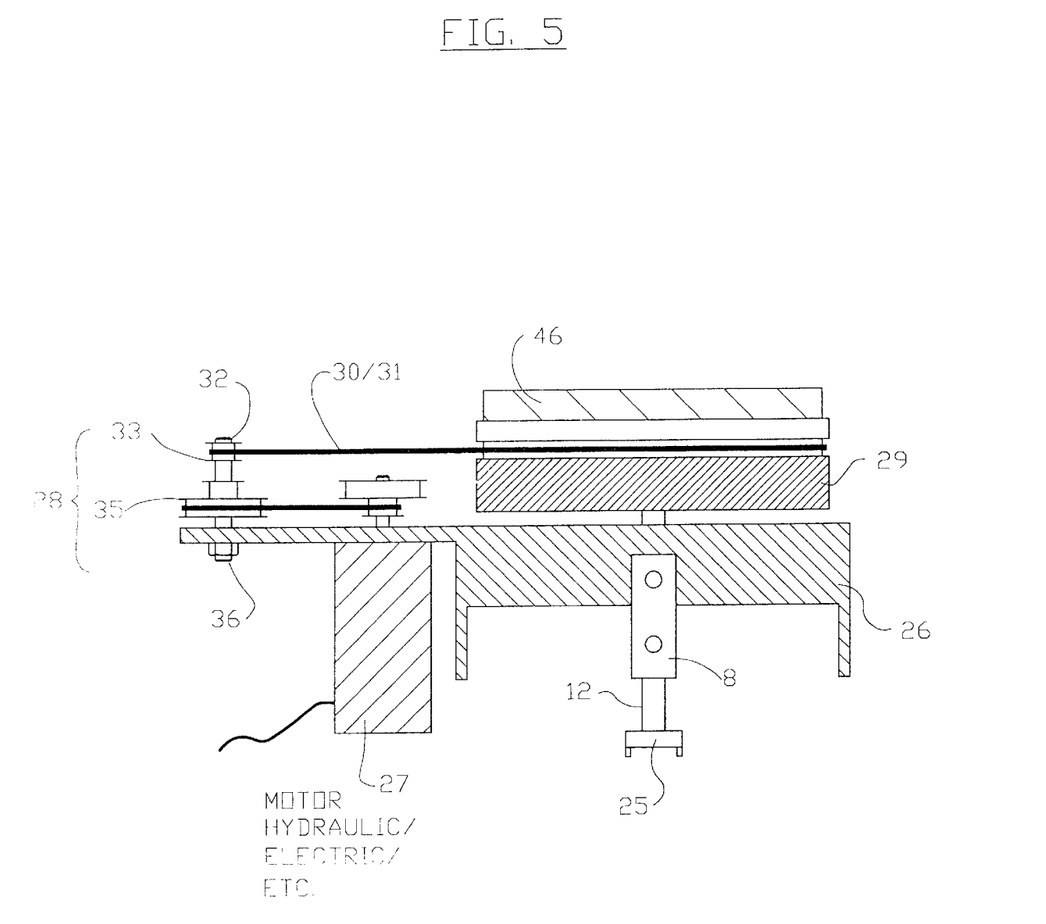
FIG. 5 is a side view of the agitator drive assembly.
Figure 5A:
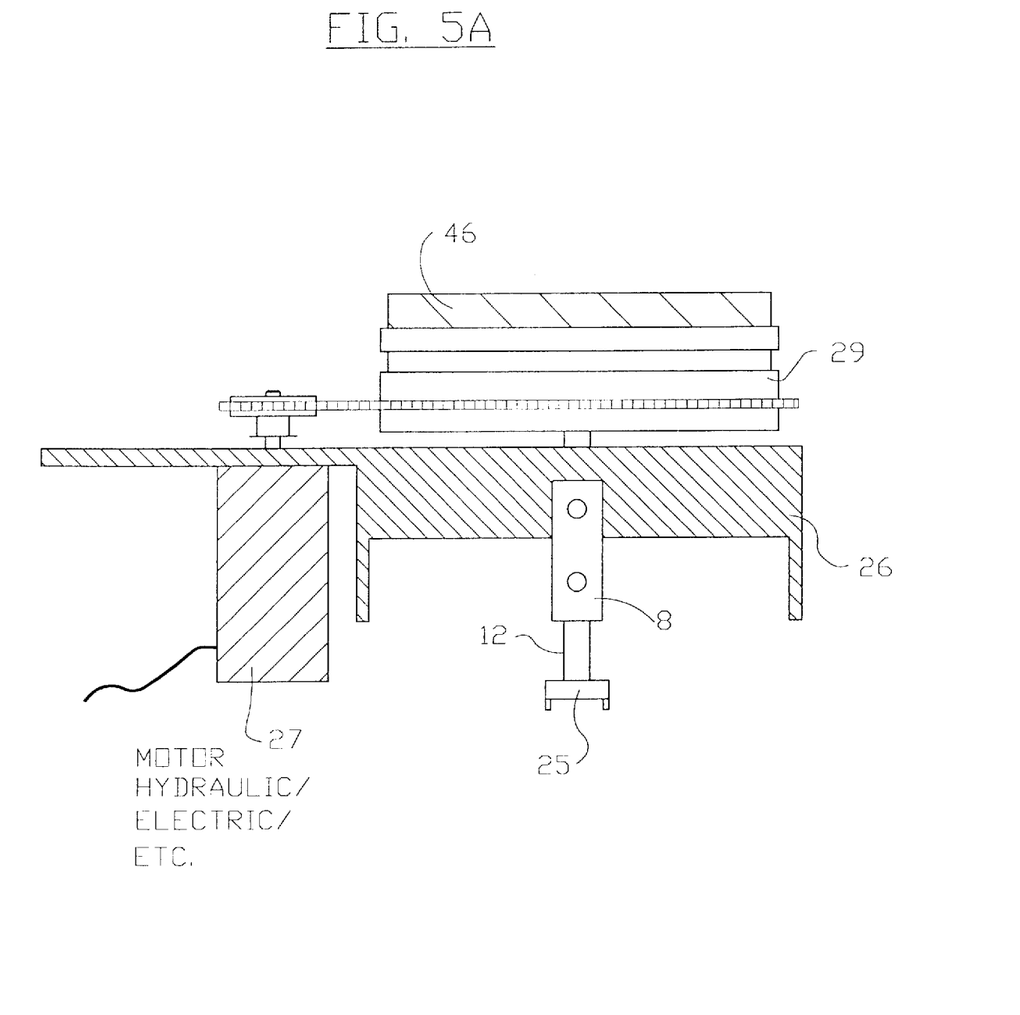
FIG. 5A shows an alternative embodiment of the seed inoculant applicator wherein the belt and the pulley drive system is replaced by a chain drive.

It is also contemplated that other drive components and systems such as a chain drive or the like could be used in place of the demonstrated belt and pulley system, and it will by understood that such variations and modifications on the agitator drive assembly are contemplated within the scope of the invention. FIG. 5A shows a chain drive system, wherein the belt system is replaced by a chain and sprocket 29 attached to the motor 27.

It is contemplated that various mounting means could be produced to allow for the stationary or moveable mounting of the seed inoculant applicator 1 on various pieces of machinery or other stationary objects. An example of mounting the seed inoculant applicator to a farm truck is shown in FIG. 8.

In operation of the seed inoculant applicator 1, the inoculant or other dry or semi-dry particulate material to be applied to the farm seed is placed in the inoculant container 2, either by pouring the inoculant material down through the spokes of the flywheel 29 or else by removing the agitator drive assembly 7 from the top of the inoculant container 2 and pouring in the inoculant material. Power to the motor 27 is turned on, and through the agitator drive assembly 7 the mixing paddle 13 and the auger 14 will begin to dispense the inoculant or other material through the end of the applicator spout 5, into the main seed loading auger or other location. The constant torque provided by the agitator drive assembly 7 means that there is no variation in the speed of the rotary shaft 12 caused by increased or decreased product levels or varying product consistencies in the inoculant container 2.

Provided that the seed inoculant applicator 1 is operated at sufficiently low speeds, it is contemplated that the inoculant or other dry or semi-dry particulate material could be loaded into the inoculant container 2 while the seed inoculant applicator 1 is in operation by pouring the inoculant or other dry or semi-dry particulate material through the spokes of the moving flywheel 29. This allows for continuous operation. In this regard, the present embodiment of the invention also shows a product retainer collar 47 attached to the top of and extending upward from the flywheel 29. This product retainer collar is of a rigid material and provides a reservoir area within which the inoculant or other product can be poured and from whence the product can work its way through the spokes of the flywheel 29 and into the inoculant container 2 for agitation and dispersal by the agitator mixing assembly 9, with the minimum amount of wastage, all of which while the seed inoculant applicator is in operation.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A seed inoculant applicator comprising an inoculant container into which dry or semi-dry material is placed; an applicator spout extending from the bottom centre of the inoculant container; an agitator mixing assembly comprising a mounting framework and a shaft component, said mounting framework attached to the inoculant container and holding the shaft component in place to the centre of the mounting framework and to the inoculant container, the shaft component consisting of a rotary shaft extending down from the top centre of the inoculant container through the inoculant container and through the applicator spout to the end of the applicator spout, to which is attached a mixing paddle which rotates within the inoculant container and an auger which rotates within the applicator spout and carries the agitated dry or semi-dry material down through the inoculant container and through the applicator spout to dispense the dry or semi-dry material through the end of the applicator spout as the rotary shaft is rotated; an agitator drive assembly consisting of a drive mounting bracket, a rotary motor and drive components, said agitator drive assembly mounted to the top of the inoculant container and engaging the rotary shaft of the agitator mixing assembly and which drives the rotary shaft of the agitator mixing assembly; and an applicator mounting bracket which allows for the stationary attachment of the seed inoculant applicator to another surface; said seed inoculant applicator operated by placing dry or semi-dry particulate material into the inoculant container, the motor is turned on and the dry or semi-dry material is agitated within the inoculant container by the mixing paddle and is dispensed evenly and constantly from the applicator spout.

2. The seed inoculant applicator as in claim 1 wherein the inoculant container is hopper-bottomed.

3. The seed inoculant applicator as in claim 1 wherein the inoculant container is cylindrical.

4. The seed inoculant applicator as in claim 1 wherein the applicator spout is cylindrical.

5. The seed inoculant applicator as in claim 1 wherein the inoculant container is detachable from the agitator drive assembly.

6. The seed inoculant applicator as in claim 1 wherein the motor provides constant torque.

7. The seed inoculant applicator as in claim 6 wherein the motor has variable speed settings.

8. The seed inoculant applicator as in claim 6 or 7 wherein the motor is electric.

9. The seed inoculant applicator as in claim 6 or 7 wherein the motor is hydraulic.

10. The seed inoculant applicator as in claim 1 wherein the applicator spout will accommodate a removable sleeve to change the inside diameter of the applicator spout and wherein the auger is removable and exchangeable for an auger of a different size.

11. The seed inoculant applicator as in claim 1 wherein the auger does not reach down the entire interior length of the applicator spout.

12. The seed inoculant applicator as in claim 1 wherein the drive components comprise a belt and pulley system for the transfer of power from the motor to the agitator mixing assembly.

13. The seed inoculant applicator as in claim 12 wherein the belt and pulley system includes a number of pulleys of different diameters which allows the switching of the drive ratio to the agitator mixing assembly and the speed of the rotary shaft without altering the constant torque on the rotary shaft.

14. The seed inoculant applicator as in claim 1 wherein the drive components comprise a chain drive system for the transfer of power from the motor to the agitator mixing assembly.

* * * * *